United States Patent [19]

Hall

[11] Patent Number: 5,395,706
[45] Date of Patent: Mar. 7, 1995

[54] SATELLITE BATTERY THERMAL/CAPACITY DESIGN

[75] Inventor: John G. Hall, Saratoga, Calif.

[73] Assignee: Space Systems/Loral, Inc., Palo Alto, Calif.

[21] Appl. No.: 182,224

[22] Filed: Jan. 14, 1994

[51] Int. Cl.⁶ .......................................... H01M 10/44
[52] U.S. Cl. .................................... 429/50; 429/120; 320/35
[58] Field of Search ................ 429/50, 120, 101; 320/2–5, 35

[56] References Cited

U.S. PATENT DOCUMENTS

| | | | |
|---|---|---|---|
| 4,324,846 | 4/1982 | Stockel | 429/101 |
| 4,567,119 | 1/1986 | Lim | 429/59 |
| 4,680,241 | 7/1987 | Dyer | 429/49 |

*Primary Examiner*—Anthony Skapars
*Attorney, Agent, or Firm*—Perman & Green

[57] ABSTRACT

A method is disclosed of operating a nickel-hydrogen battery when the battery is less than fully charged. Specifically, battery recharge is completed at a temperature $T_1$, in the range of approximately $-10°$ C. to $-30°$ C. which is lower than a temperature $T_2$ in the range of approximately $-10°$ C. to $+5°$ C., at which discharge begins. The temperature $T_1$ is chosen to maximize the extent of the reaction represented by the equation:

$$Ni(OH)_2 + OH^- = NiOOH + H_2O + e^-.$$

versus the reaction represented by the equation:

$$H_2O + 2e^- = OH^- + \tfrac{1}{2}O_2$$

Subsequently, it is desirable to heat the battery to the temperature $T_2$ in readiness for discharge. A preferred recharge temperature is less than approximately $-10°$ C. The battery includes a positive electrode which may include electrochemically active $Ni(OH)_2$ possibly mixed with $Co(OH)_2$ and electrically conductive material having a resistivity less than approximately 0.1 ohm-cm, a negative electrode which is of a material which catalyzes the oxidation and reduction of $H_2$, and an electrolyte which is a solution of KOH.

9 Claims, 3 Drawing Sheets

SATELLITE BATTERY THERMAL/CAPACITY DESIGN

BACKGROUND OF THE INVENTION

I. Field of the Invention

The present invention relates generally to a method of operation of a nickel-hydrogen battery, and more particularly, to the method of recharging a nickel-hydrogen battery at a temperature which is substantially lower than the temperature at which discharge is performed.

II. Description of the Prior Art

It is well recognized that optimum performance for nickel hydrogen spacecraft batteries requires that their temperature be controlled in the range of $+20°$ C to $-10°$ C. Higher temperatures lead to lowered capacity due to the early on-set of the parasitic electrolysis reaction, e.g., $$2OH^- = \tfrac{1}{2}O_2 H_2O + 2e^- \quad (1)$$

Reaction (1) has been recognized in the prior art to reduce capacity as the operating temperature of the battery is increased. A key to the present invention has been the recognition that the critical temperature is that at which the battery is recharged and reaction (1) competes with the normal recharge reaction, e.g., $$Ni(OH)_2 + OH^- = NiOOH + H_2O + e^- \quad (2)$$

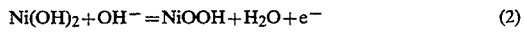

Lower temperatures on the other hand have been found to lead to batteries which fail to operate. The reasons for this failure, prior to the present invention, were unclear as the freezing point of the electrolyte ($-61°$ C.) is well below the minimum operation temperature. The second key to the present invention has been the recognition that the lower temperature limit is due to a limitation in the ability of the battery to sustain high rate discharge required in satellites situated in a geosynchronous orbit (e.g., $\sim C/1.5$) as opposed to the lower rate recharge (e.g., $\sim C/10$).

Typical of the prior art as it relates to charging and discharging nickel batteries is U.S. Pat. No. 4,680,241 to Dyer. The Dyer patent concerns a method for partially or fully restoring the lost capacities of nickel batteries. In this instance, a nickel battery is cycled at least 10 times, with each cycle including a discharging step during which the capacity achieved at the end of the previous cycle is reduced by at least 5 percent, and a charging step. The charging rate employed during the charging step is greater than about C/10 per hour. Moreover, while the ratio of the amount of charge delivered to the battery during the charging step of each cycle to the amount of charge withdrawn from the battery during the previous cycle is greater than one, this ratio is chosen so that the temperature of the electrolyte of the battery does not exceed about 30° C. It is clear, however, that the Dyer patent does not address the particular problem which the present invention is intended to solve. It was in light of the state of the technology as just described that the present invention has been conceived and is now reduced to practice.

SUMMARY OF THE INVENTION

The present invention relates to a method of operating a nickel-hydrogen battery which increases its charge capacity. The method comprises the step of completing the recharging process for the battery at a temperature $T_1$, in the range of approximately $-10°$ C. down to $-30°$ C. which is lower than a temperature $T_2$, in the range of approximately $-10°$ C. to $+5°$ C. at which discharge customarily begins At the onset of the recharge operation the temperature may be in the range of $+25°$ C. to $+40°$ C. However, as recharge proceeds, the temperature is caused to fall to the range of $-10°$ C. to $-30°$ C. which is optimum for full recharge. The temperature $T_1$ is chosen to maximize the extent of the reaction represented by the equation:

$$Ni(OH)_2 + OH^- = NiOOH + H_2O + e^-.$$

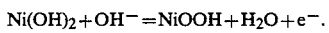

versus the reaction represented by the equation:

$$2OH^- = \tfrac{1}{2}O_2 H_2O + 2e^-$$

Subsequently, it is desirable to heat the battery to the temperature $T_2$ in readiness for discharge. A preferred recharge temperature is less than approximately $-10°$ C. The battery includes a positive electrode which may include electrochemically active $Ni(OH)_2$ (possibly mixed with $Co(OH)_2$) and electrically conductive material having a resistivity less than approximately 0.1 ohm-cm, a negative electrode which is of a material which catalyzes the oxidation and reduction of $H_2$, and an electrolyte which is a solution of KOH (typically 20% to 40% by weight).

Accordingly, a primary object of the invention is the provision of a unique method for increasing the capacity of a nickel-hydrogen battery.

Another object of the invention is to provide a method of increasing the capacity of a nickel-hydrogen battery by charging at a temperature, or within a range of temperatures, which is lower than the temperature at which discharge begins.

A further object of the invention is to provide such an improved method in which the extent of the reaction represented by the equation $$2OH^- = \tfrac{1}{2}O_2 H_2O + 2e^-$$

is maximized in relation to the reaction represented by the equation $$Ni(OH)_2 + OH^- = NiOOH + H_2O + e^-.$$

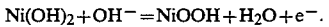

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

DETAILED DESCRIPTION OF THE PREFERRED EMBODIMENT

Figure 1:
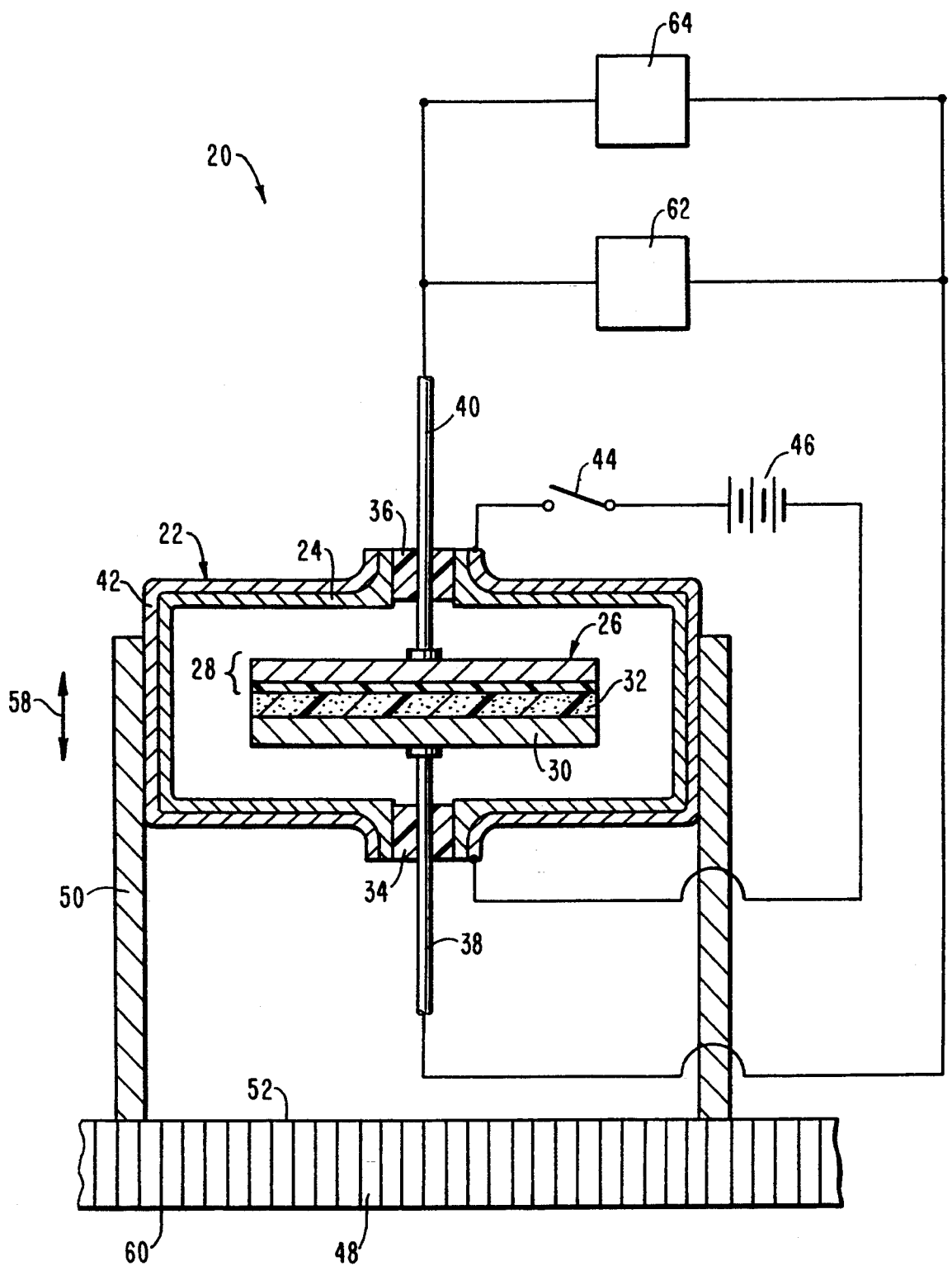
FIG. 1 is a diagrammatic representation of a battery system embodying the present invention and including a cross section view of a cell of a nickel-hydrogen battery used with the system.

As shown in FIG. 1, a nickel-hydrogen battery system 20 of the type with which the invention is concerned includes a cell 22 provided with a pressure vessel 24 and an electrode stack 26 within the pressure vessel. The electrode stack 6, in turn, includes a positive electrode 28, a negative electrode 30, and a porous separator 32 which also serves as an electrolyte reservoir for storing excess electrolyte within the electrode stack 26. The porous separator 32 may be composed of zirconia, asbestos, plastic, and the like. The positive electrode 28 includes electrochemically active nickel hydroxide and electrically conductive material having a resistivity less than approximately 0.1 ohm/cm. The negative electrode 30 is of a material which catalyzes the oxidation and reduction of hydrogen gas and, in typical fashion, the electrolyte is a solution of potassium hydroxide (KOH).

The cell 22 also has electrical lead throughs 34, 36 through which negative and positive electrical leads 38, 40 respectively pass.

A suitable electrically energized heater jacket 42 overlies the pressure vessel 24. By closure of a switch 44, heating elements within the heater jacket 42 can be energized by a suitable source 46 of EMF for heating the cell 22.

The cell 22 is thermally connected to an optical space radiator (OSR) 48 via a thermally conductive sleeve 50. The sleeve 50 is mounted on one side 42 of the OSR 48 and slidably envelops an outer peripheral surface 54 of the cell 22. A side 60 of the OSR 48 opposite side 52 faces black space. The cell is continuously cooled by the OSR and its temperature is determined by bucking the OSR with the heater jacket 42.

On a spacecraft which is the intended venue for the cell 22, a solar array 62 is the primary power source indicated for recharging the cell 22 and a typical load 64 is indicated for the discharge cycle of the cell.

Figure 2:
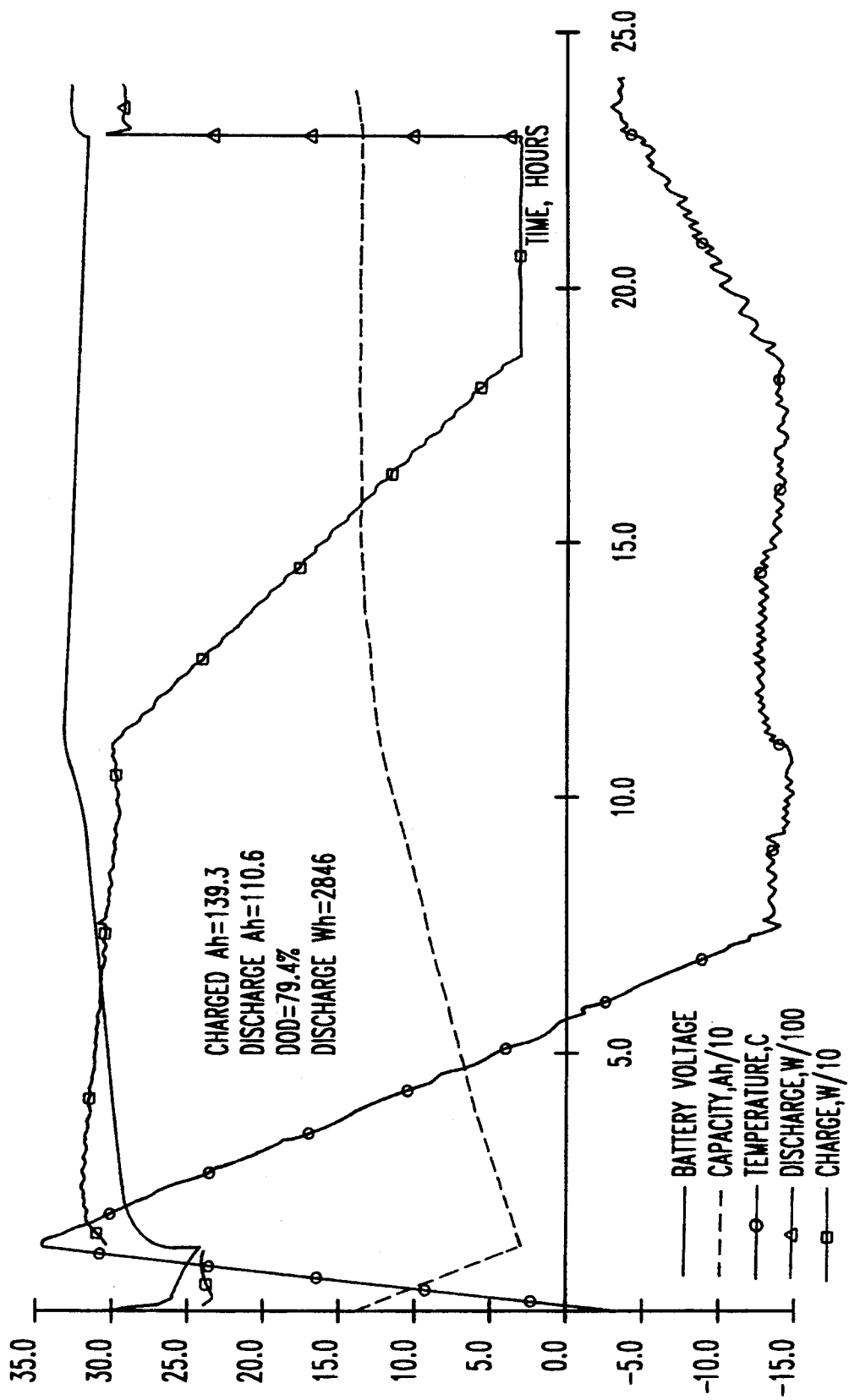
FIG. 2 is a graph depicting the operation of a cell according to the invention, presenting various parameters over the course of time.

FIG. 2 presents a typical operation according to the invention. As seen therein, as a discharging operation ensues, the temperature of the cell 22 rises rapidly over the course of a 72 minute eclipse discharge to a temperature of approximately 34° C. This represents the customary temperature increase which occurs whenever a battery is being discharged. Cooling is effected by conduction of heat from the cell via its sleeve to the OSR which radiates to deep space. The temperature rise in FIG. 2 is due to the discharge heat generation rate exceeding the OSR heat dissipation rate. Charging of the battery is then effected by means of the solar array 62. As charging proceeds, the temperature of the cell 22 decreases as a) the recharge rate is typically less than 20% of the discharge rate, b) battery operates endothermically during much of recharge and c) the OSR dissipates heat faster than the batter generates heat until a minimum temperature is reached between five and six hours after charging was initiated. The benefit of the invention is achieved by allowing the temperature to decline in such a manner that at the end of a charging process the cell 22 is at a temperature which is lower than that at which discharge begins. Thus, when charging ends approximately 17 hours after it began, at the beginning of a quiescent period, the temperature of the cell is again raised to a temperature which is preferably within the range of $-10°$ C. to $+10°$ C. This temperature rise is achieved by closure of the switch 44 to energize the heater jacket 42. Approximately 22 hours after charging began, the cell 22 is ready for discharge.

Figure 3:
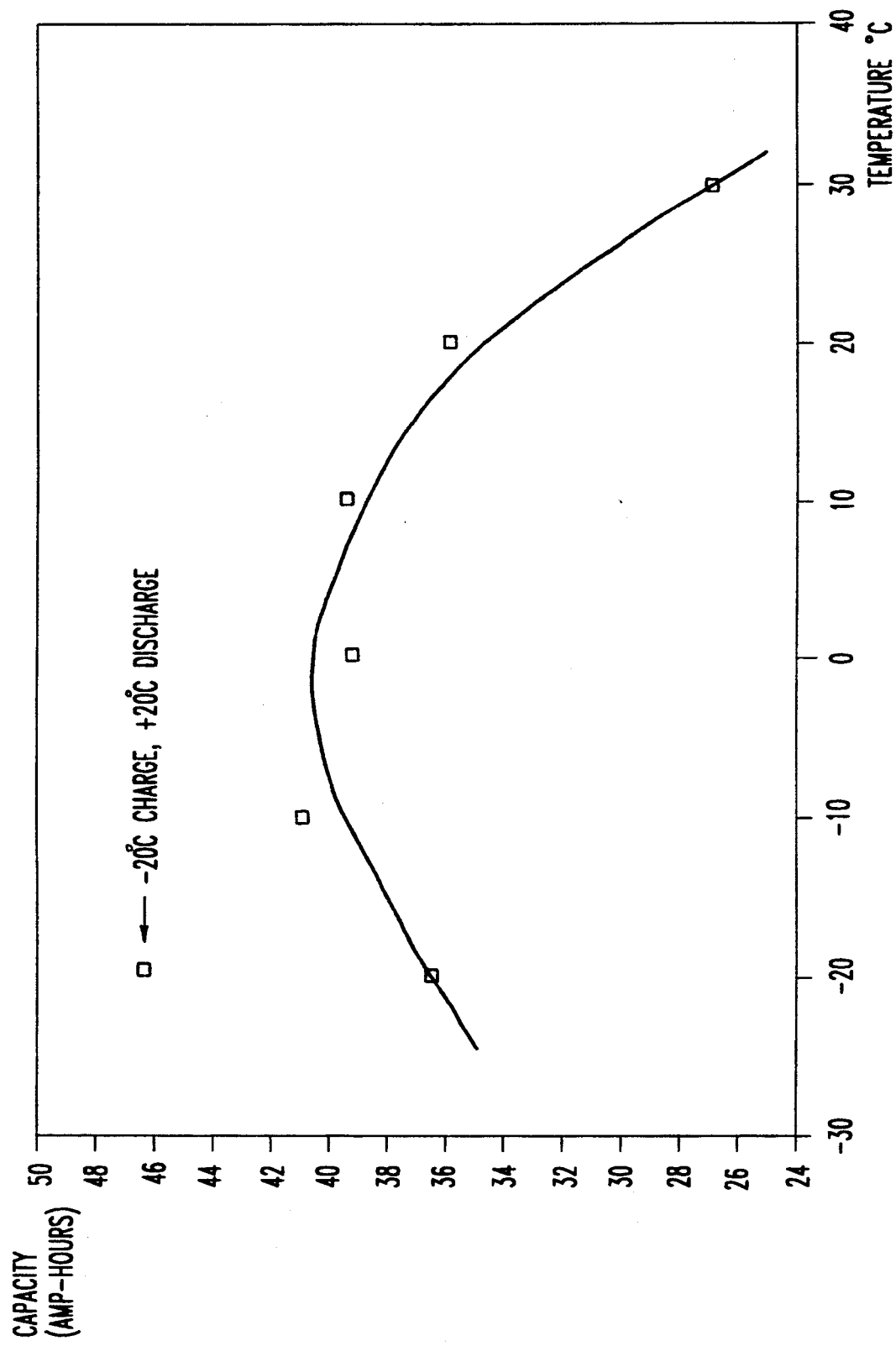
FIG. 3 is a graph presenting nickel-hydrogen cell capacity versus isothermal charge and discharge temperature.

In FIG. 3, a plot is provided of nickel-hydrogen cell capacity versus the isothermal charge and discharge temperature. As can be seen in FIG. 3, the delivered cell capacity peaks at a temperature between 0° C. and $+10°$ C. Also provided in the figure is a datum in which the cell is charged at $-20°$ C. and discharged at $+20°$ C. As can be seen, this bimodal temperature operation leads to the highest cell capacity. The interpretation of this result is that the kinetics of cell discharge are improved at high temperature whereas the kinetics of cell charging are more optimum at lower temperature.

In a second test, a cell was (a) charged and discharged at $-20°$ C., (b) charged at $-20°$ C., allowed to stand at open circuit for 4 hours and then discharged at $-20°$ C. and (c) charged at $-20°$ C., warmed to $+10°$ C. and discharged. Case (c) operated in a fashion comparable to case (a). The interpretation of these results is as follows:

(i) in case (a), the internal heating of the cell was sufficient to raise its temperature to a point at which it was operable at an abnormally low temperature;

(ii) in case (b), the open circuit period led to a decrease in the cell internal temperature to a point at which the cell could no longer support a high rate of operation; and (iii) in case (c), the cold recharge capacity which could not be extracted in case (b) was available once the temperature was increased to a point at which the battery was operable.

While a preferred embodiment of the invention has been disclosed in detail, it should be understood by those skilled art that various other modifications may be made to the illustrated embodiment without departing from the scope of the invention as described in the specification and defined in the appended claims.

I claim:

1. A method of operating a nickel-hydrogen battery which includes a positive electrode, a negative electrode, and an electrolyte, the battery being less than fully charged, the method comprising the step of:

(a) reaching a full state of charge in a battery at a temperature $T_1$ between approximately $-10°$ C. and $-30°$ C. which is lower than a temperature $T_2$, in the range of approximately $-10°$ C. to $+5°$ C., at which discharge begins.

2. A method of operating a nickel-hydrogen battery as set forth in claim 1 wherein temperature $T_1$ is chosen to maximize the extent of the reaction represented by the equation:

$$2OH^- = \tfrac{1}{2}O_2H_2O + 2e^-$$

versus the reaction represented by the equation:

$$Ni(OH)_2 + OH^- = NiOOH + H_2O + e^-.$$

3. A method of operating a nickel-hydrogen battery as set forth in claim 1 including the step, after step (a), of:

(b) heating the battery to the temperature $T_2$ in readiness for discharge.

4. A method of operating a nickel-hydrogen battery as set forth in claim 1
wherein the temperature of the battery before the completion of recharge is less than approximately $-10°$ C.

5. A method of operating a nickel-hydrogen battery as set forth in claim 1
wherein the positive electrode includes electrochemically active $Ni(OH)_2$ and electrically conductive material having a resistivity less than approximately 0.1 ohm-cm;
wherein the negative electrode is of a material which catalyzes the oxidation and reduction of $H_2$; and
wherein the electrolyte is a solution of KOH.

6. A method of operating a nickel-hydrogen battery which includes a positive electrode, a negative electrode, and an electrolyte, the method comprising the steps of:
(a) discharging the battery, causing its temperature to rise to an elevated level;
(b) charging the battery while the temperature thereof is at the elevated level;
(c) cooling the battery; and
(d) reaching a full state of charge in the battery when the battery is at a temperature $T_1$ between approximately $-10°$ C. and $-30°$ C. which is lower than a temperature $T_2$, in the range of approximately $-10°$ C. to $+5°$ C., at which discharge begins.

7. A method of operating a nickel-hydrogen battery as set forth in claim 6
wherein temperature $T_1$ is chosen to maximize the extent of the reaction represented by the equation:

$$2OH^- = \tfrac{1}{2}O_2 H_2O + 2e^-$$

versus the reaction represented by the equation:

$$Ni(OH)_2 + OH^- = NiOOH + H_2O + e^-.$$

8. A method of operating a nickel-hydrogen battery as set forth in claim 6 including the step, after step (e), of:
(f) heating the battery to the temperature $T_2$ in readiness for discharge.

9. A method of operating a nickel-hydrogen battery as set forth in claim 6
wherein the temperature of the battery before the completion of recharge is less than approximately $-10°$ C.

* * * * *

UNITED STATES PATENT AND TRADEMARK OFFICE
CERTIFICATE OF CORRECTION

PATENT NO. : 5,395,706
DATED : March 7, 1995
INVENTOR(S) : John C. Hall

It is certified that error appears in the above-indentified patent and that said Letters Patent is hereby corrected as shown below:

On the cover page, section [75], the inventor's name should read --John C. Hall--.

In col. 4, claim 2, line 60, the equation should read --$2OH^- = \tfrac{1}{2}O_2 + H_2O + 2e^-$--.

In col. 6, claim 7, line 11, the equation should read --$2OH^- = \tfrac{1}{2}O_2 + H_2O + 2e^-$--.

Signed and Sealed this

Twenty-third Day of May, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,395,706
DATED : March 7, 1995
INVENTOR(S) : John C. Hall

It is certified that error appears in the above-identified patent and that said Letters Patent is hereby corrected as shown below:

In col. 1, line 20 should read --$2OH^- = \tfrac{1}{2}O_2 + H_2O + 2e^-$--.

In col. 2, line 17 should read --$2OH^- = \tfrac{1}{2}O_2 + H_2O + 2e^-$--.

In col. 2, line 43 should read --$2OH^- = \tfrac{1}{2}O_2 + H_2O + 2e^-$--.

Signed and Sealed this

Twenty-seventh Day of June, 1995

Attest:

BRUCE LEHMAN

Attesting Officer     Commissioner of Patents and Trademarks